(12) United States Patent
Enosaki et al.

(10) Patent No.: US 9,219,802 B2
(45) Date of Patent: Dec. 22, 2015

(54) GATEWAY AND IN-VEHICLE NETWORK SYSTEM

(75) Inventors: Takeshi Enosaki, Nagoya (JP); Masaya Ohi, Okazaki (JP); Yuzo Harata, Chiryu (JP); Yasuyuki Takahashi, Okazaki (JP); Hideki Yakabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 776 days.

(21) Appl. No.: 13/559,823

(22) Filed: Jul. 27, 2012

(65) Prior Publication Data

US 2013/0031212 A1    Jan. 31, 2013

(30) Foreign Application Priority Data

Jul. 28, 2011   (JP) ................................. 2011-165718
Sep. 6, 2011    (JP) ................................. 2011-193991

(51) Int. Cl.
  G06F 15/16    (2006.01)
  H04L 29/06    (2006.01)
  H04L 12/40    (2006.01)
  H04L 12/46    (2006.01)

(52) U.S. Cl.
  CPC ............... *H04L 69/28* (2013.01); *H04L 12/40* (2013.01); *H04L 12/4625* (2013.01); *H04L 2012/40273* (2013.01)

(58) Field of Classification Search
  CPC ............... H04L 12/40; H04L 2012/40273; H04L 12/4625; H04L 69/28; B60R 16/0315
  USPC ................. 709/218, 224, 232; 701/29.1, 34.4
  See application file for complete search history.

(56) References Cited

U.S. PATENT DOCUMENTS

| | | | | |
|---|---|---|---|---|
| 9,055,022 B2 * | 6/2015 | Ricci | .................... | G06F 3/0484 |
| 9,094,206 B2 * | 7/2015 | Di Crescenzo | ..... | H04L 63/0869 |
| 2003/0009271 A1 * | 1/2003 | Akiyama | .............. | G06F 21/335 701/29.6 |
| 2003/0137409 A1 * | 7/2003 | Kikkawa | ................. | B60R 25/04 340/426.11 |
| 2005/0027404 A1 * | 2/2005 | Ban | ....................... | B60W 50/00 701/1 |
| 2005/0154497 A1 * | 7/2005 | Strege | .................... | G01B 21/26 700/279 |
| 2005/0253726 A1 * | 11/2005 | Yoshida | ................. | B60R 25/04 340/572.8 |
| 2008/0262662 A1 * | 10/2008 | Higashi | ................. | B60R 25/209 701/2 |
| 2008/0304499 A1 * | 12/2008 | Jeon | ....................... | H04L 12/66 370/401 |
| 2010/0268980 A1 * | 10/2010 | Watanabe | ............. | H04J 3/0685 714/2 |

FOREIGN PATENT DOCUMENTS

JP   2009-098908   5/2009
JP   2011-109337   6/2011

OTHER PUBLICATIONS

Office Action issued Aug. 6, 2013 in corresponding JP Application No. 2011-165718 (with English translation).

* cited by examiner

*Primary Examiner* — Arvin Eskandarnia
*Assistant Examiner* — Farhan Mahmoud Jamal
(74) *Attorney, Agent, or Firm* — Harness, Dickey & Pierce, P.L.C.

(57) ABSTRACT

An in-vehicle system comprising a gateway between multiple networks is disclosed. One of the networks specifies that when a source apparatus connected to the one of the networks sends a request message to a destination apparatus connected to another one of the networks, the source apparatus should time-out if the source apparatus does not receive a response message within a specified time after sending the request message. Upon receipt of the request message, the gateway relays the request message to the destination apparatus and sends a wait request code to the source apparatus to instruct the source apparatus to wait by extending the specified time.

4 Claims, 9 Drawing Sheets

WAIT REQ CODE (NRC 0x78)

| CAN-ID | Pci | 7F | SID | NRC |

RELAY HISTORY

| DEST ECU | NO OF ECUs | RES TIME (ms) | NML/ABNML |
|---|---|---|---|
| ECU ○○ | 2 | 520 | NML |
| ECU △△ | 0 | 20 | NML |
| ECU ◎◎ | 3 | 880 | NML |
| ECU ×× | 1 | -- | ABNML |

GATEWAY AND IN-VEHICLE NETWORK SYSTEM

CROSS REFERENCE TO RELATED APPLICATION

The present application is based on and claims priority to Japanese Patent Applications No. 2011-165718 filed on Jul. 28, 2011 and No. 2011-193991 filed on Sep. 6, 2011, disclosures of which are incorporated herein by reference.

TECHNICAL FIELD

The present disclosure relates to a gateway and an in-vehicle network system in which the gateway relays a data between networks.

BACKGROUND

A vehicle is equipped with various apparatuses which are connected via a network and which exchange data via this network in accordance with a predetermined communication protocol (see JP-2005-47488A corresponding to US-2005/0027404A).

For the data exchange between the apparatuses connected to the network, a communication protocol specifies that a process be time-out and ended when there is no response within a specified time after requesting to send a data.

For example, in diagnostic communication of a CAN communication protocol, when a diagnostic tool sends a request message to a diagnosis target electronic control unit (ECU) via a gateway, and when the diagnostic tool does not receive a response message responding to the request massage within a specified time (e.g., 100 milliseconds) from sending the request message to the diagnosis target ECU, the diagnostic tool determines that the diagnosis target ECU could not receive the request message.

In recent years, in accordance with communication protocol diversification, the number of gateways performing protocol conversion is increasing and a network configuration is becoming complex, and as a result, a request massage and a response massage are relayed by multiple gateways. As the network configuration becomes complex, it becomes difficult to receive the response message within a time-out period specified in the communication protocol.

There is a system in which a vehicle manager ECU monitors data of each ECU on a network to provide a diagnostic service for each ECU (see JP-2003-19931A corresponding to US-2003/0009271A)

There is also a system in which a diagnostic tool can connect to an in-vehicle network, acquire various data from each ECU connected to the in-vehicle network, and provide a diagnostic service for the ECU.

In the above system, it is possible to perform various diagnoses by making a change in setting state of a specific service. For example, it is possible to individually configure a security setting for a general maintenance, for an authorized store (dealer), and for a developer, and it is possible to individually perform the diagnosis by unlocking the security setting. In this kind of system, it is possible to unlock a security lock in accordance with procedures specified in a communication protocol to perform the diagnosis. For example, in the diagnostic communication of the CAN communication, the diagnostic tool sends a session transition request to request the ECU to transition from an initial session, in which a security-locked state is to be maintained, to a diagnostic session, in which a security-unlocked state is to be maintained. In response to this session transition request, the ECU transition from the initial session to the diagnostic session. After the ECU sends a session response (affirmative response) to the diagnostic tool in response to the session transition request, the diagnostic tool sends a security unlocking request to the ECU. Upon establishment of the security unlocking, the ECU becomes the security unlocked state. In this system, continuation of the security unlocked state for a long time lowers the security. Thus, after elapse of a predetermined session time-out period (e.g., 5 seconds), the ECU returns to the security-locked state by transitioning from the session, which maintains the security-unlocked state, to the session, which maintains the security-locked state.

According to the diagnostic communication of the CAN communication, upon elapse of a specified time, the specific service setting state such as security setting, door lock setting and the like returns to an initial state. Additionally, times for various settings to return to the initial state are managed by session.

In a case of simple network configuration, it is possible to unlock the security of the ECU and diagnose the ECU in the above-described procedure.

However, in recent years, in accordance with diversification and sophistication of services of in-vehicle apparatuses, a vehicle is mounted with ECUs supporting various communication protocols such as CAN, LIN, FlexRay, KWP2000 and the like. The ECUs diffrent in communication protocol from each other are connected to each other via gateways in the network system. Because of this, there are multiple gateways between a diagnostic tool and an ECU.

In the above complex network configuration, data latency and delay is large. Thus, for example, the following situation may arise. After the diagnostic tool sends the session transition request to an ECU and the ECU sends an affirmative response to the diagnostic tool in response to the session transition request, the ECU is time-out (session time-out) and returns to the initial session before the diagnostic tool sends the security unlocking request to the ECU. In this case, it becomes impossible to diagnose the ECU.

SUMMARY

The present disclosure is made in view of the foregoing. It is an object of the present disclosure to provide a gateway and an in-vehicle network system that enable normal completion of various services such as diagnostic service or the like even when a time-out can occur due to communication protocol specifications, security-related settings or the like.

According to a first example of the present disclosure, a gateway for performing data relay between a plurality of networks is provided, wherein at least one of the networks specifies that when a source apparatus connected to the at least one of the networks sends a request message to a destination apparatus connected to another one of the networks different from the at least one of the networks, the source apparatus should time-out if the source apparatus does not receive, within a specified time after sending the request message, a response message responding to the request message. The gateway comprises a wait request sending device that, upon receipt of the request message sent from the source apparatus to the destination apparatus, relays the request message to the destination apparatus and sends to the source apparatus a wait request code which instructs the source apparatus to wait by extending the specified time.

According to the above gateway, it becomes possible to provide various services such as diagnostic service or the like even if a time-out can occur because of communication protocol specifications, security-related settings or the like.

According to a second example of the present disclosure, an in-vehicle network system is provided. The in-vehicle network system comprises a gateway disposed between a network connected with an electronic control unit (ECU) and another network adapted to be connected with a diagnostic tool. The diagnostic tool is configured to diagnose the ECU. When the ECU receives a session transition request from the diagnostic tool via the gateway, the ECU transitions from an initial session to a specific session and sends a session response to the diagnostic tool via the gateway in accordance with receipt of the session transition request, where the session transition request requests the ECU to transition from the initial session, in which a specific service setting state is to be an initial state, to the specific session, in which the specific service setting state is to be a specific state different from the initial state. When the diagnostic tool receives the session response, the diagnostic tool sends a state transition request to the ECU via the gateway, where the state transition request requests the specific service setting state of the ECU to transition from the initial state to the specific state. When the ECU receives the state transition request from the diagnostic tool via the gateway in a state where the ECU has transitioned to the specific session, the specific service setting state of the ECU transitions from the initial state to the specific state. Upon elapse of a specified time since transitioning of the ECU from the initial session to the specific session, the ECU transitions from the specific session to the initial session and the specific service setting state returns to the initial state. The gateway includes a first timer, a session state recording device, and a session maintaining request sending device. The first timer measures an elapsed time from when the gateway receives the session transition request, which is sent from the diagnostic tool to the ECU to request the ECU to transition from the initial session to the specific session. The session state recording device estimates an ECU's session state recognized by the diagnostic tool based on the elapsed time measured by the first timer, and records the estimated ECU's session state in a storage medium. In cases where the ECU's session state recognized by the diagnostic tool is determined to be the specific session based on the ECU's session state stored in the storage medium, the session maintaining request sending device sends a session state maintaining request, which instructs the ECU to maintain the specific session, to the ECU in order to prevent the ECU from transitioning from the specific session to the initial session.

According to the above in-vehicle network system, it becomes possible to provide various services such as diagnostic service or the like even if a time-out can occur because of communication protocol specifications, security-related settings or the like.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
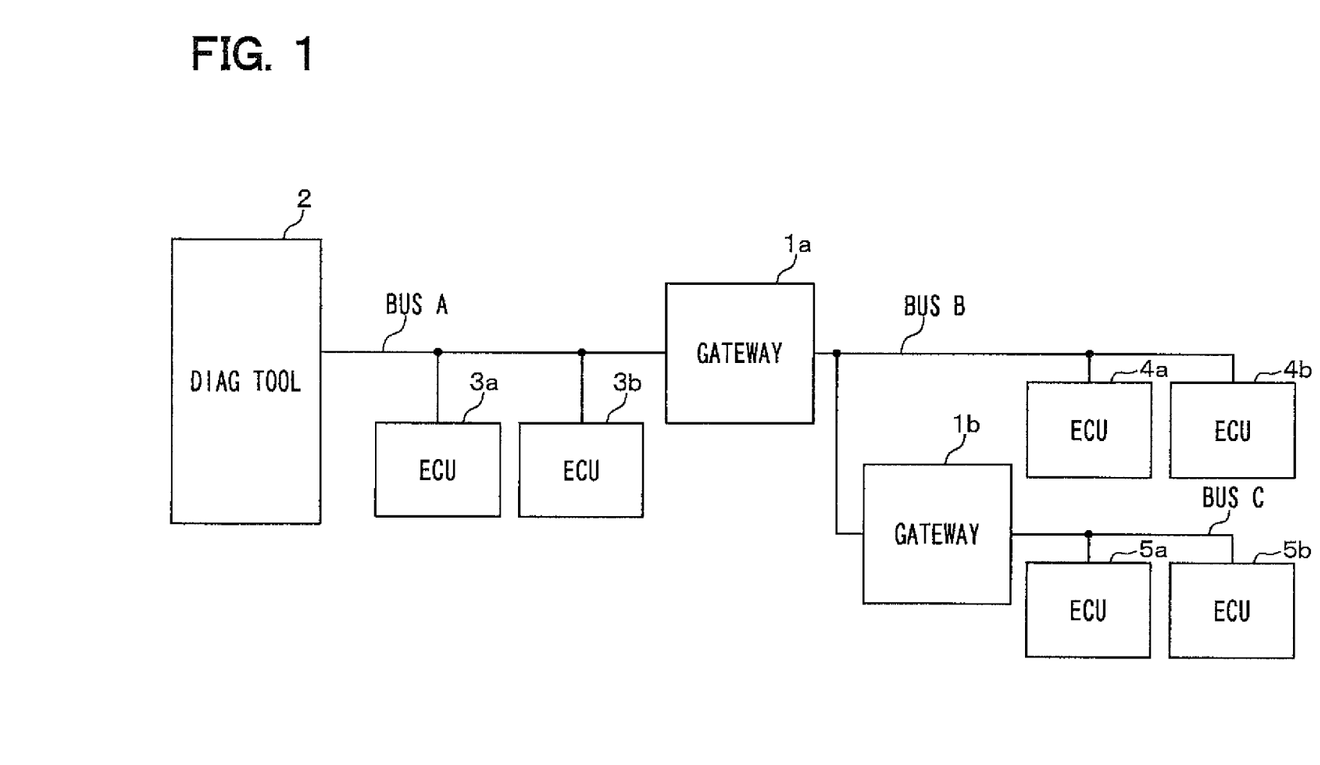
FIG. 1 is a diagram illustrating an in-vehicle LAN system including a getaway.

An in-vehicle LAN system including a getaway of a first embodiment is illustrated in FIG. 1. The in-vehicle LAN system includes gateways 1a, 1b, ECUs 3a, 3b, 4a, 4b, 5a, 5b, and buses A, B, C.

The ECUs 3a, 3b and the diagnostic tool 2 are connected with the bus A. The ECUs 4a, 4b are connected with the bus B. The ECUs 5a, 5b are connected with the bus C.

Figure 6:
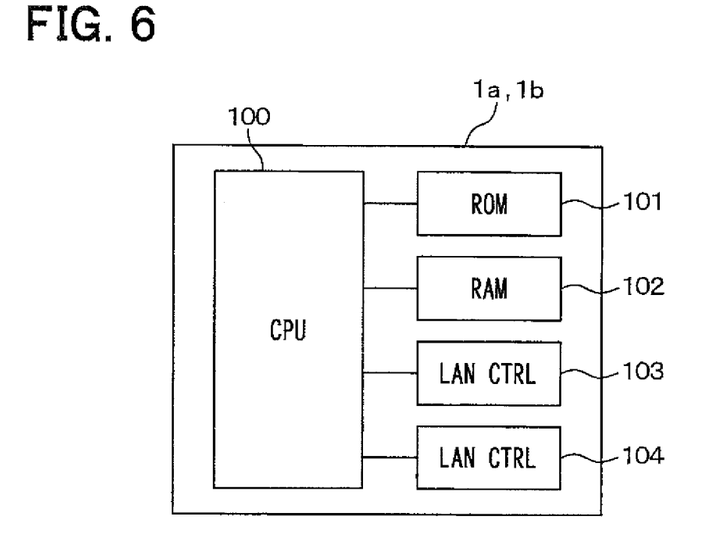
FIG. 6 is a block diagram illustrating a gateway.

Networks connected with the bus A, the bus B and the bus C are different in communication protocol. In the present embodiment, the communication protocol of the bus A is a CAN communication protocol. The communication protocol of the bus B is the CAN communication protocol. The communication protocol of the bus C is a FlexRay communication protocol, Each gateway 1a, 1b includes a central processing unit (CPU) 100, a read-only memory (ROM) 101, a random access memory (RAM) 102, and a focal area network (LAN) controller 103, 104, as shown in FIG. 6. The CPU 100 executes various processes in accordance with programs stored in the ROM 101. The gateway 1a and the gateway 1b have substantially the same configuration. The LAN controller 103, 104 performs data transmission and receipt in accordance with a data format specified in the communication protocols of the respective communication protocols.

The getaway apparatus 1a performs protocol conversion between the communication protocol of the bus A and the communication protocol of the bust B to relay the data. The getaway 1b performs protocol conversion between the communication protocol of the bus B and the communication protocol of the bust C to relay the data.

A diagnostic tool 2, which collects a variety of information from each ECU to perform failure diagnosis or the like, is connected to the bus A.

The CAN communication protocol specifies that when a source apparatus connected to a network sends a request massage to a destination apparatus connected to a different network, the source apparatus should time-out if the source apparatus does not receive a response message within a specified time after sending the request message. In the above, the response message is a massage responding to the request message. The source apparatus connected to the network is for example the diagnostic tool 2. The destination apparatus connected to the different network is for example the ECU 4a. Therefore, when the source apparatus does not receive the response message within the specified time after sending the request massage, the source apparatus performs processing on assumption that the destination apparatus has not receive the request message.

In the present embodiment, in relaying the request message or the like from the diagnostic tool 2 to the ECU 4a, the gateway 1a sends a wait request code to the diagnostic tool 2 to instruct the diagnostic tool 2 to wait 5 seconds by extending the specified time (100 milliseconds).

Figure 2:
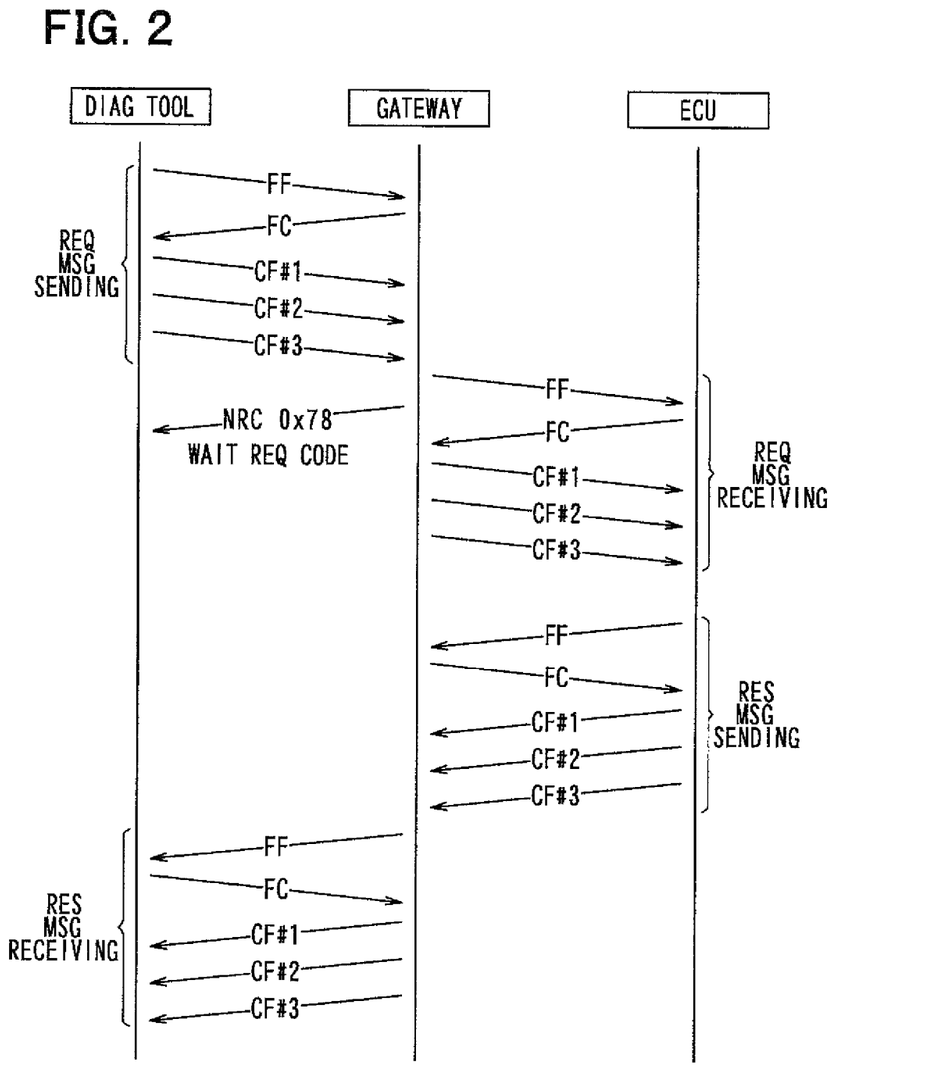
FIG. 2 is a diagram illustrating a signal flow among a diagnostic tool, a gateway, and an ECU according to a first embodiment.

FIG. 2 illustrates a signal flow among the diagnostic tool 2, the gateway 1a and the ECU 4a in cases where the request message is sent from the diagnostic tool 2 to the ECU 4a. With reference to FIG. 2, the signal flow among the diagnostic tool 2, the gateway 1a and the ECU 4a in cases where the request message is sent from the diagnostic tool 2 to the ECU 4a will be explained.

When the diagnostic tool 2 sends a first frame (FF) to the gateway 1a, the gateway 1a sends a flow control (FC) to the diagnostic tool 2. Upon receipt of the flow control (FC), the diagnostic tool 2 sequentially sends consecutive frames #1, #2, #3. When the diagnostic tool 2 completes sending the consecutive frame #3, the sending of the request message is ended.

Upon completing receipt of the request message from the diagnostic tool 2, the gateway 1a relays the received request message to the ECU 4a, and additionally, sends the wait request code to the diagnostic tool 2 to instruct the diagnostic tool 2 to extend the specified time (100 milliseconds) and wait 5 seconds. For example, when the gateway 1a completes receipt of the request message from the diagnostic tool 2; the gateway 1a immediately sends a NRCOx78 code, which is specified in the diagnostic communication of the CAN communication protocol, as the wait request code to the diagnostic tool 2. Additionally, when the gateway 1a sends the first frame (FF) to the ECU 4a and the ECU 4a sends the flow control (FC) to the gateway 1a, the gateway 1a sequentially sends the consecutive frames #1, the consecutive frame #2 and the consecutive frame #3 to the ECU 4a. As can be seen in the above, the diagnostic tool 2 and the gateway 1a exchange various kinds of frame to complete the relay of the request message.

Upon completing receipt of the request message, the ECU 4a sends the response message to the diagnostic tool 2 to respond to the request massage. Specifically, when the ECU 4a sends a first frame (FF) to the gateway 1a and the gateway 1a sends a flow control (FC) to the ECU 4a, the ECU 4a sequentially sends consecutive frames (CF) #1, #2, #3 to the gateway 1a. As can be seen in the above, the ECU 4a and the gateway 1a exchange various kinds of frame to complete sending of the response message.

Upon completing receipt of the response message, the gateway 1a relays the received response massage to the diagnostic tool 2. Specifically, when the gateway la sends the first frame (FF) to the diagnostic tool 2 and the diagnostic tool 2 sends the flow control (FC) to th gateway 1a, the gateway 1a sequentially sends the consecutive frame (CF) #1, the consecutive frame (CF) #2 and the consecutive frame (CF) #3 to the diagnostic tool 2. As can be seen in the above, the diagnostic tool 2 and the gateway 1a exchange various kind of frame to complete the relay of the response message.

The diagnostic tool 2 measures, by using a timer, a time period from a time of starting sending the request message to a time of receiving the response massage. If the diagnostic tool 2 does not receive the response message after elapse of 100 milliseconds, the diagnostic tool 2 is usually time-out. However, if the diagnostic tool 2 receives the wait request code, the diagnostic tool 2 resets the timer and changes the specified time (time-out period) from 100 milliseconds to 5 seconds. Therefore, even in a situation where the diagnostic tool 2 cannot receive the response message within the specified time (time-out period) because of the data relay to the ECU via many gateways, the diagnostic tool 2 can receive the response message without the time-out. This is because the gateway 1a can send the wait request code to the diagnostic tool 2 and the specified time (time-out period) can be extended on a diagnostic tool 2 side.

Figure 3:
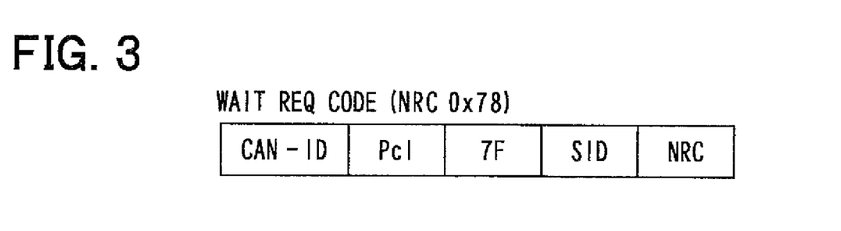
FIG. 3 is a diagram illustrating a frame format of a wait request code according to the first embodiment.

FIG. 3 is a diagram illustrating a frame format of NRC0x78 code. In the present embodiment, the NRC0x78 code, which has the frame format as illustrated in FIG. 3, is sent as the wait request code to the source apparatus (e.g., the diagnostic tool 2).

Figure 4:
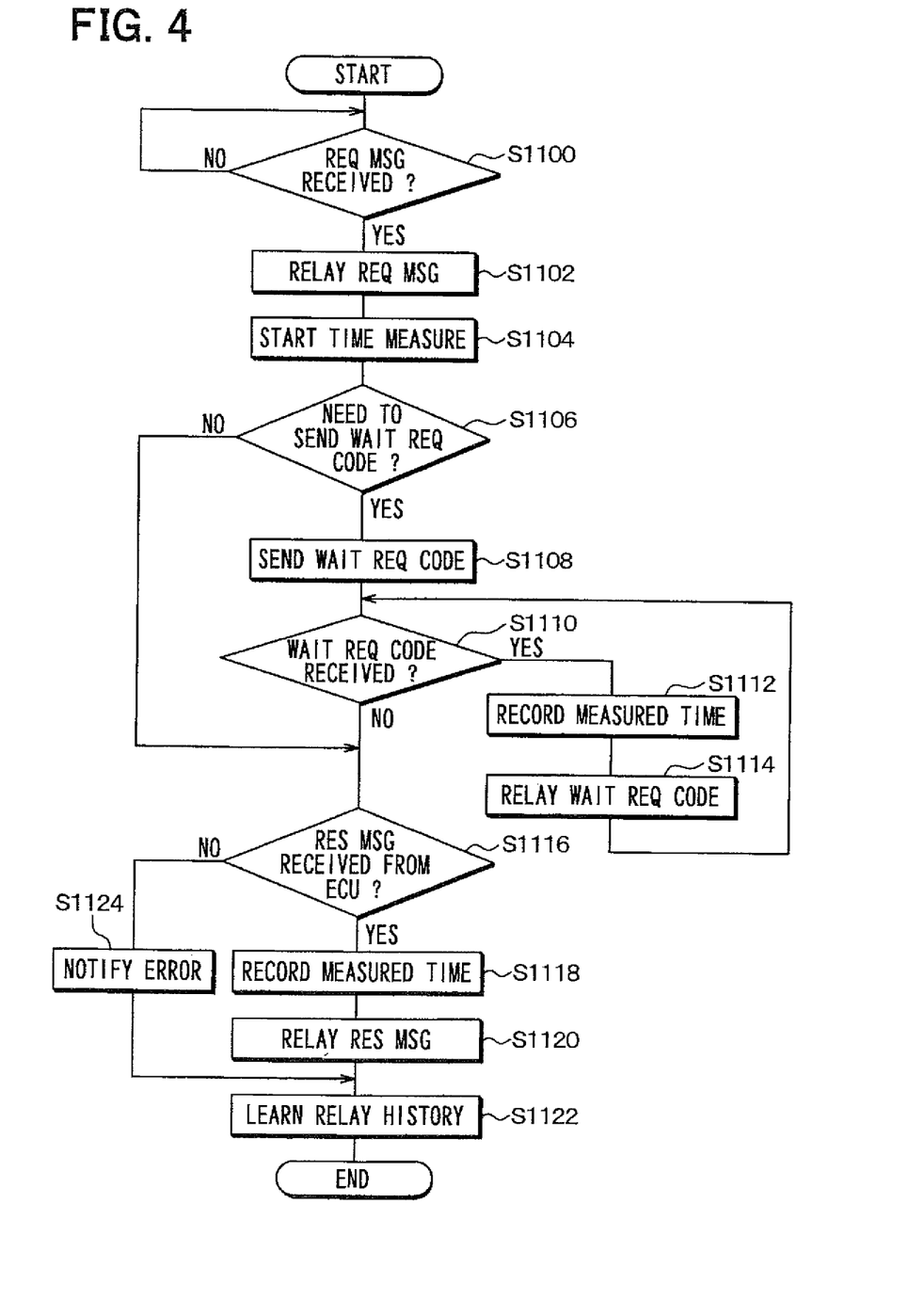
FIG. 4 is a flowchart illustrating processing performed by a gateway according to the first embodiment.

The processing of the gateway 1a in cases where the gateway 1a relays the data between the diagnostic tool 2 and the ECU 5a will be described. FIG. 4 is a flowchart illustrating the processing of the gateway 1a. The gateway 1a (specifically, the CPU 100) performs the processing illustrated in FIG. 4 at regular intervals.

At S1100, the gateway 1a determines whether or not the gateway 1 receives the request massage. When the request massage is not received, corresponding to NO at S1100, the gateway 1a repeats performing the determination at S1100.

When the request massage sent from the diagnostic tool 2 to the ECU 5a is received, corresponding to YES at S1100, the processing proceeds to S1102. At S1102, the gateway 1a relays this request message to the ECU 5a. Specifically, the gateway 1a relays the request massage to the ECU 5a via the gateway 1b by performing the protocol conversion from the CAN communication protocol of the bus A to the LIN communication protocol of the bus B.

At S1104, the gateway 1a starts measuring time. Specifically, by resetting the timer, the gateway 1a starts the time measurement.

At S1106, the gateway 1a determines, based on the below-described relay history, whether or not it is necessary to send the wait request code based on a relay history. Now, it is assumed that it is necessary to send the wait request code. In this case, the determination at S1106 results in YES, and the processing proceeds to S1108. At S1108, the gateway 1a sends the wait request code. Specifically, the gateway 1a sends the NRC0x78 code, which is specified in the diagnostic communication of the CAN communication protocol, as the wait request code to the diagnostic tool 2.

At S1110, the gateway 1a determines whether or no the gateway 1a receives the wait request code within a specified time. For example, when the request massage relayed at S1102 is relayed to the ECU 5a by the gateway 1b and the wait request code is sent to the diagnostic tool 2 from the gateway 1b, the gateway 1a receives this wait request code. In this case, the determination YES is made at S1110, and the processing proceeds to S112. At S1112, the gateway 1a records the measured time in the memory. Specifically, in the memory, the gateway 1a records the value of the timer at a time of receiving the wait request code.

At S1114, the gateway 1a relays the wait request code to the diagnostic tool 2, and then the processing returns to S1110 to again determine whether or not the gateway 1a receives the wait request code. When the gateway 1a does not receive the wait request code within the specified time, corresponding to NO S1110, the processing proceeds to S1116. At S1116, the gateway 1a determines whether or not the gateway 1a receives the response message from the ECU.

When the ECU 5a receives the request message and sends the response message and when the gateway 1a receives this response message, the determination YES is made at S1116, and the processing proceeds to S1118. At S1118, the gateway 1a records the measured time. Specifically, in the memory, the gateway 1a records the value of the timer at a time of receiving the response message.

At S1120, the gateway 1a relays the response message to the diagnostic tool 2. Specifically, the gateway 1a relays the response message to the diagnostic tool 2 by performing the protocol conversion from the LIN communication protocol of the bus B to the CAN communication protocol of the bus A.

At S1122, the gateway 1a learns the relay history, and then ends this processing. When the response message from the ECU 5a is not received, corresponding to NO at S1116, the processing proceeds to S1124. At S1124, the gateway 1a notifies the diagnostic tool 2 of an error. Specifically, the gateway 1a sends an error code, which is specified in the diagnostic communication of the CAN communication protocol, to the diagnostic tool 2. Thereafter, at S1122, the gateway 1a learns the relay history, and ends this processing.

Figure 5:
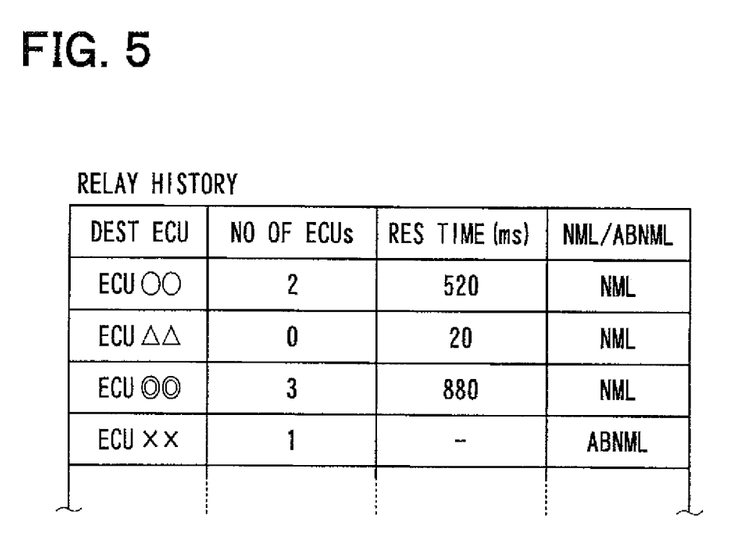
FIG. 5 is a diagram illustrating a learning result of a relay history according to the first embodiment.

FIG. 5 shows an example of a learning result of the relay history. As shown in FIG. 5, for each destination ECU, the number of gateways, the response time, and information indicative of normal or abnormal (normal/abnormal information) are stored in the memory as the relay history.

The number of gateways can be obtained from the number of times the wait request code is received. The response time is a time period from a time of relaying the request massage to a time of receiving the response massage.

In the present embodiment, when the response time is shorter than the specified time (100 milliseconds), it is determined at S1106 that it is not necessary to send the wait request code. When the response time is longer than the specified time (100 milliseconds), it is determined at S1106 that it is necessary to send the wait request code.

Additionally, when a relay destination of the request massage is an ECU determined as abnormal, it is determined at S1106 that it is not necessary to send the wait request code. When a relay destination of the request massage is an ECU determined as normal, it is determined at S1106 that it is necessary to send the wait request code.

According to the above configuration, upon receipt of the request message sent from the source apparatus to the destination apparatus, the gateway relays the request message to the destination apparatus and sends to the source apparatus the wait request code which instructs the source apparatus to extend the specified time and wait. Therefore, without extension of individual time-out periods by an apparatus connected with a network, the time-out and the resultant failure to receive the response message can be prevented.

When it is determined that there is an abnormality in the data relay, the gateway notifies the source apparatus that there is the abnormality in the data relay. Therefore, the source apparatus can recognize that there is the abnormality in the data relay.

The gateway learns a relay history of at least one of the request message, the response message and the wait request code, and records a learning result of the relay history in a storage medium. Based on the learning result of the relay history stored in the storage medium, the gateway determines whether or not it is necessary to send the wait request code. When the gateway determines that it is necessary to send the wait request code, the gateway sends the wait request code to the source apparatus, which is a source of the request message. Therefore, for example, unnecessary sending of the wait request code to the source apparatus and resultant lowering responsiveness can be prevented. Additionally, by acquiring the relay history from the gateway, the diagnostic tool can recognize the response time from the gateway to each ECU, and/or recognize the number of gateways between the gateway and the ECU, and the like.

The first embodiment can be modified in various ways, examples of which will be described.

In the above-described embodiment, the getaway learns the relay histories of the request massage, the response message and the wait request code. However, the getaway may learn the relay history of at least one of the request massage, the response message and the wait request code.

In the above-described embodiment, the data relay is performed on assumption that the diagnosis tool 2 can correspond to a source apparatus and that the ECU can correspond to the destination apparatus. However, an apparatus other than the diagnosis tool 2 and the ECU can be the source apparatus or the destination apparatus.

In the above embodiment, the gateway (specifically, CPU 100) performing S1108 can correspond to a wait request sending device or means. The gateway (specifically, CPU 100) performing S1116 can correspond to an abnormality determining device or means. The gateway (specifically, CPU 100) performing S1124 can correspond to a notifying device or means. The gateway (specifically, CPU 100) performing S1122 can correspond to a relay history learning device or means. The gateway (specifically, CPU 100) performing S1106 can correspond to a wait request code sending determining device or means. The gateway (specifically, CPU) performing S1104 and S1118 can correspond to a measuring device or means.

Second Embodiment

FIG. 1 also illustrates a configuration of an in-vehicle network system of a second embodiment. The in-vehicle network system includes gateways 1a, 1b (also called gateway apparatuses), ECUs 3a, 3b, 4a, 4b, 5a, 5b, and buses A, B, C.

The ECUs 3a, 3b are connected to the bus A. The ECUs 4a, 4b are connected to the bus B. The ECUs 5a, 5b are connected to the bus C. The gateway 1a is connected between the bus A and the bus B. The gateway 1b is connected between the bus B and the bus C.

In the present embodiment, a communication protocol of the network connected with the bus A and the bus B is a CAN communication protocol. A communication protocol of the network connected with the bus C is a FlexRay communication protocol.

FIG. 6 is a block diagram illustrating the gateway 1a, 1b. Each gateway 1a, 1b includes a central processing unit (CPU) 100, a read-only memory (ROM) 101, a random access memory (RAM) 102, and local area network (LAN) controllers 103, 104. The CPU 100 executes various processing in accordance with programs stored in the ROM 101. The gateway 1a and the gateway 1b have substantially the same configuration. The LAN controllers 103, 104 perform data transmission and receipt in accordance with data forms specified in communication protocols of respective buses A to C.

The gateway 1a relays a data between the network of the bus A and the network of the bus B. The gateway 1b relays a data between the network of the bus B and the network of the bus C.

The diagnostic tool 2 collects a variety of information from each ECU to perform failure diagnosis or the like. The diagnostic tool 2 is connected to the bus A. The diagnostic tool 2 can unlock (deactivate) the security setting and perform the diagnosis in accordance with a procedure specified in the communication protocol. In order to unlock the security setting of the ECU 5a and perform the diagnosis of the ECU 5a, the diagnostic tool 2 sends a session transition request to the ECU 5a. The session transition request requests the ECU 5a to transition from an initial session, in which the security lock is to be maintained, to a diagnostic session, in which the security lock is to be deactivated. Then, the ECU 5a sends a session response (affirmative response) to the diagnostic tool 2 in response to the session transition request. After receiving this session response, the diagnostic tool 2 sends a security unlocking request (corresponding to a restriction unlocking request) to the ECU 5a. After placing the ECU 5a in the security-unlocked state, the diagnostic tool 2 diagnoses the ECU 5a.

Each of sessions such as the initial session, the diagnostic session and the like refers to a session specified in the session layer, which is one of the seven layers of the Open Systems Interconnection (OSI) model developed by the International Organization for Standardization (ISO). The sessions include a programming session, an extended diagnostic session and the like, in addition to the initial session and the diagnostic session.

In the present in-vehicle network system, continuation of the security-unlocked state for a long time lowers the security. Thus, upon elapse of a predetermined time (e.g., 5 seconds) specified in the communication protocol, the ECU 4a, 4b, 5a, 5b returns to the security-locked state by transitioning from the diagnostic session, in which the security lock is to be deactivated, to the initial session, in which the security lock is to be maintained.

Specifically, the diagnostic tool 2 includes a session client timer for measuring a time from when a control target ECU transitions from the initial session to the diagnostic session. When the measured time of the session client timer exceeds the specified time, the diagnostic tool 2 performs processing on assumption that the control target ECU has returned to the initial session.

Each ECU 3a, 3b, 4a, 4b, 5a, 5b includes a session server timer for managing a session state. When each ECU 3a, 3b, 4a, 4b, 5a, 5b recognizes elapse of the specified time with use of the session server timer, the ECU 3a, 3b, 4a, 4b, 5a, 5b transitions to the initial session and returns to the security-locked state.

In the in-vehicle network system, upon the elapse of the specified time, various settings such as the security setting, the door lock setting and the like are returned to the initial state. A time management in returning various settings to the initial state is performed by the session.

When a network configuration complexity delays the data relay between the diagnostic tool 2 and a control target ECU the following situation may arise. Even when the control target ECU transitions from the initial session to the diagnostic session in response to the request from the diagnostic tool 2, the control target ECU is not diagnosed within the specified time and transitions from the diagnostic session to the initial session. As a result, the diagnosis cannot be performed correctly.

In view of this, the gateway 1a, 1b of the present embodiment includes a session timer A and a session timer B. The session timer A measures a time elapsed from when the gateway receives the session transition request requesting the control target ECU to transition from the initial session to a specific session. The session timer B is used in instructing the control target ECU to maintain the session state at the specific session to prevent the control target ECU from transitioning from the specific session to the initial session. Specifically, based on the elapsed time measured by the session timer A, the gateway estimates the control target ECU's session state recognized by the diagnostic tool. The gateway records the estimated control target ECU's session state in the RAM.

When the gateway determines, based on the session state stored in the RAM, that the control target ECU's session state recognized by the diagnostic tool is the specific session, the gateway instructs, with use of the session timer B, the control target ECU to maintain the session state at the specific session in order to prevent the control target ECU from transitioning from the specific session to the initial session.

Figure 7:
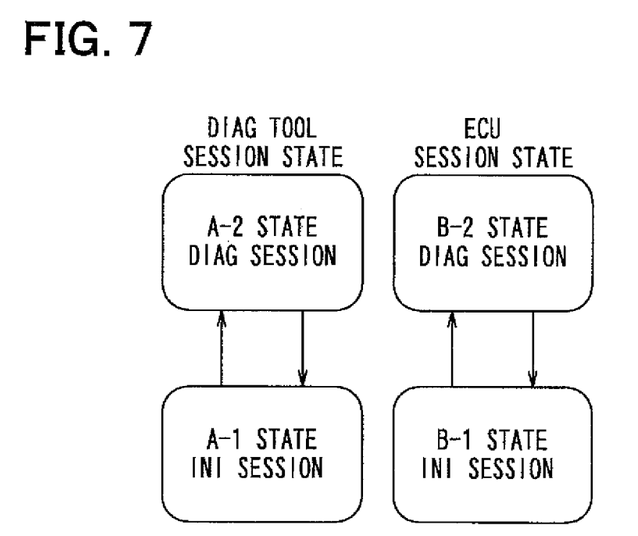
FIG. 7 is a diagram illustrating a session state managed by a gateway according to the second embodiment.

FIG. 7 illustrates the session state managed by the gateway I a. The gateway (GW) 1a includes the session timer A for managing the session between the diagnostic tool 2 and the gateway 1a, and uses the session timer A to estimate the control target ECU's session state recognized by the diagnostic tool 2. Specifically, when the gateway 1a receives from the diagnostic tool 2 the session transition request which requests to transition to the diagnostic session, the gateway 1a changes the control target ECU's session state recognized by the diagnostic tool 2 from the initial session (A-1) to the diagnostic session (A-2). Thereafter, when the session timer A of the gateway 1a is time-out or when the gateway 1a .receives from the diagnostic tool 2 the session transition request which requests to transition to the initial session, the gateway 1a changes the control target ECU's session state recognized by the diagnostic tool 2 from the diagnostic session (A-2) to the initial session (A-1).

The gateway 1a further includes the session timer B for matching (i) the session state of the control target ECU recognized by the diagnostic tool 2 with (ii) an actual session state of the control target ECU. Note that the session state of the control target ECU recognized by the diagnostic tool 2 is estimated with use of the session timer A. The gateway 1a synchronizes the session state of the control target ECU recognized by the diagnostic tool 2 with the actual session state of the control target ECU with use of this session timer B. Specifically, with use of the session timer B, the gateway 1a measures a time elapsed from when the control target ECU transitions from the initial session (B-1) to the diagnostic session (B-2), and additionally, the gateway 1a regularly sends a state maintaining request to the control target ECU on behalf of the diagnostic tool 2 each time the session timer B is time-out (session time-out). This prevents occurrence of the following difficulty; because of network configuration complexity, the control target ECU transitions from the diagnostic session to the initial session before the diagnostic tool 2 sends the security unlocking request to the control target ECU, and as a result, the session state of the control target ECU recognized by the diagnostic tool 2 does not match the actual session state of the control target ECU.

Figure 8:
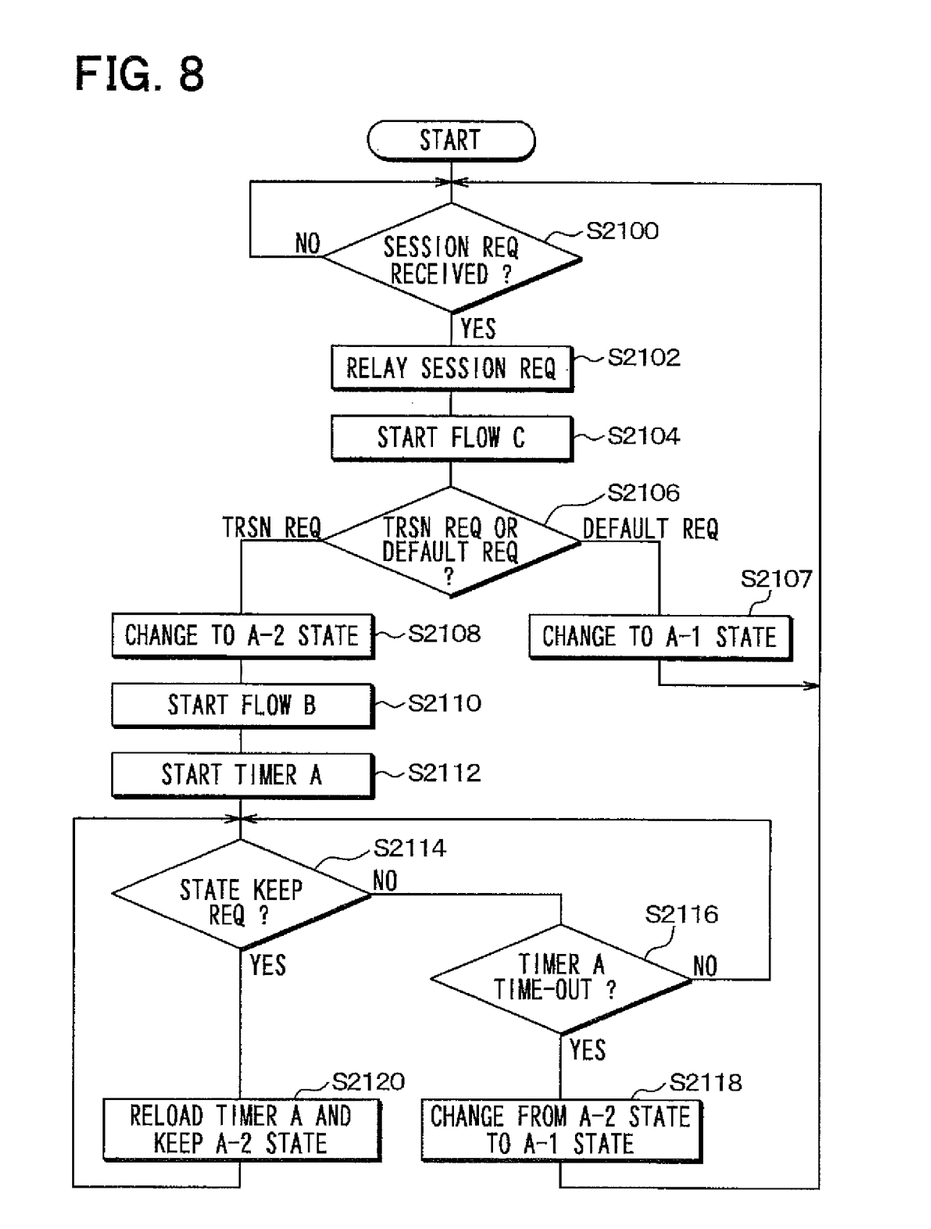
FIG. 8 is a flowchart illustrating processing of a gateway of according to a second embodiment.
Figure 9:
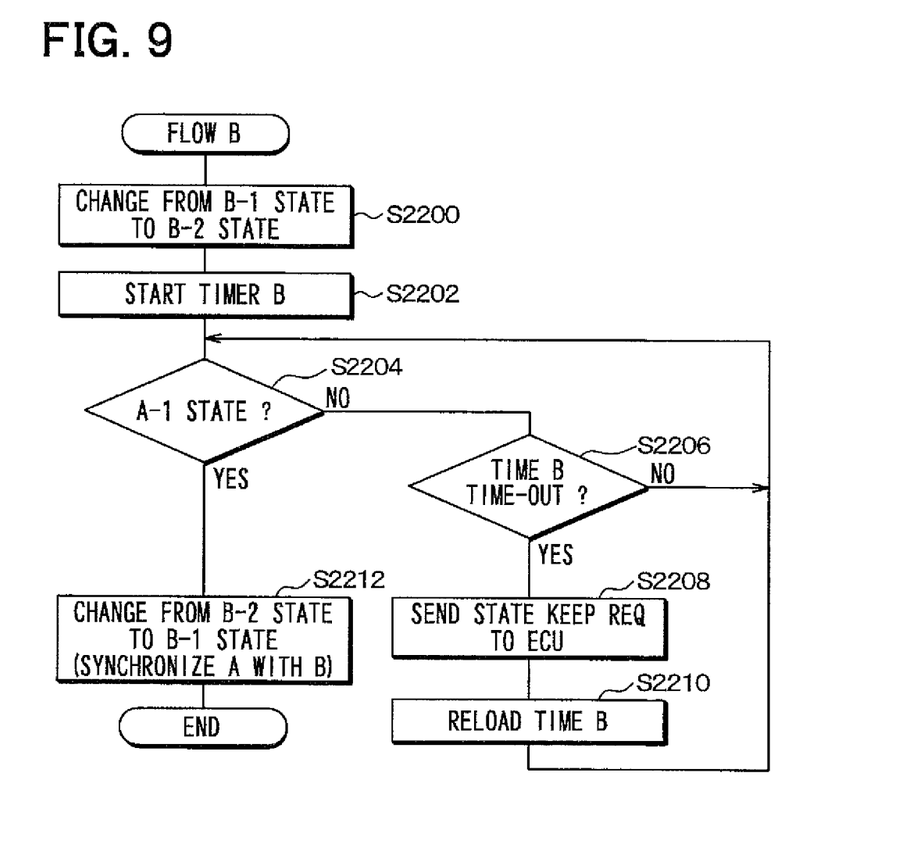
FIG. 9 is a flowchart illustrating a flow B according to the second embodiment.
Figure 10:
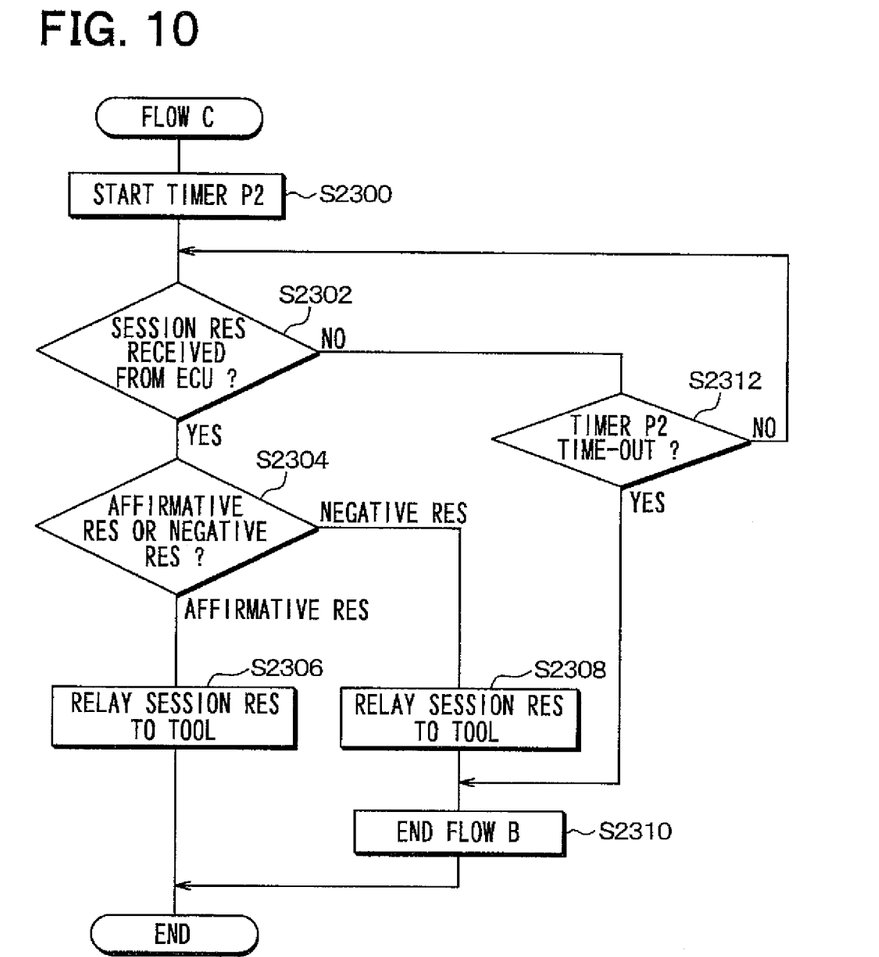
FIG. 10 is a flowchart illustrating a flow C according to the second embodiment.

FIGS. 8 to 10 illustrate the processing performed by the gateway 1a in cases where the diagnostic tool 2 diagnoses the ECU 4a. The gateway 1a cyclically performs the processing illustrated in FIG. 8. In the following explanation, it is assumed that the ECU 4a is in the initial session and the security locked state.

At S2100, the gateway 1a makes a determination of whether or not the gateway 1a receives a session request message from the diagnostic tool 2. When the session request massage is not received, the gateway 1a repeatedly performs the determination at S2100. When the session request message is received, corresponding to YES at S2100, the processing proceeds to S2102. At S2102, the gateway 1a relays the session request message to the ECU 4a.

Upon receipt of this session request message, the ECU 4a determines whether the session request message requests the ECU 4a to transition to the diagnostic session or the initial session. When the ECU 4a determines that the session request message requests the ECU 4a to transition to the diagnostic session, the ECU 4a transition from the initial session to the diagnostic session. When the ECU 4a determines that the session request message requests the ECU 4a to transition to the initial session, the ECU 4a maintains the initial session.

At S2104, the gateway 1a starts performing a flow C illustrated in FIG. 10. In this flow C, the gateway 1a relays a session response, which is sent from the ECU 4a in response to receipt of the session request message, to the diagnostic tool 2. Details of the flow C will be described later.

At S2106, the gateway 1a determines whether or not the received session request massage is a transition request (i.e., a request to transition to the diagnostic session) or a default request (i.e., a request to transition to the initial session).

When the received session request massage is the default request (i.e., request to transition to the initial session), the processing proceeds to S2107. At S2107, the gateway 1a changes the session state of the ECU4a recognized by the diagnostic tool 2 to an A-1 state (the initial session). Specifically, information indicating that the diagnostic tool's session state is the A-1 state (the initial session) is recorded in the RAM. Then the processing returns to S2100.

When the received session request massage is the transition request (i.e., a request to transition to the diagnostic session), the processing proceeds to S2108. At S2108, the gateway 1a changes the session state of the ECU4a recognized by the diagnostic tool 2 to an A-2 state (the diagnostic session). Specifically, in the RAM, the gateway 1a records information indicating that the session state of the ECU 4a recognized by the diagnostic tool 2 is the A-2 state (the diagnostic session). Then the processing proceeds to S2110. At S2110, the gateway 1a starts performing the flow B illustrated in FIG. 9. In the flow B, the gateway 1a estimates the session state of the ECU 4a recognized by the ECU 4a. When the session state of the ECU 4a recognized by the ECU 4a is determined to be a specific session, the gateway 1a instructs, on behalf of the diagnostic tool, the control target ECU to maintain the specific session in order to prevent the control target ECU from transitioning from the specific session to the initial session. Details of the flow B will be described later.

At S2112, the gateway 1a starts time measurement with the session timer A. Specifically, with use of the session timer A, the gateway 1a measures a time elapsed from when the session state of the ECU 4a recognized by the diagnostic tool becomes the A-2 state (diagnostic session).

At S2114, the gateway 1a determines whether or not there is a state maintaining request message from the diagnostic tool 2.

When the gateway 1a receives the state maintaining request message from the diagnostic tool 2, corresponding to YES at S2114, the processing proceeds to S2120. At S2120, the gateway 1a reloads the session timer A and maintains the A-2 state (diagnostic session). Thereafter, the processing returns to S2114. In the above, "reload' refers to "reset counter value of the timer and restart to count".

When the gateway 1a does not receive the state maintaining request message from the diagnostic tool 2, corresponding to NO at S2114, the processing proceeds to S2116. At S2116, the gateway 1a determines whether or not the session timer A is time-out. Specifically, the gateway 1a determines whether or not the measured time of the session timer A exceeds the specified time (e.g., 5 seconds).

When the measured time of the session timer A does not exceed the specified time, corresponding to NO at S2116, the processing returns to S2114. When the measured time of the session timer A exceeds the specified time, corresponding to YES at S2116, the processing proceeds to S2118. At S2118, the gateway 1a changes the session state of the ECU 4a recognized by the diagnostic tool 2 from the A-2 state (diagnostic session) to the A-1 state (initial session). Thereafter, the processing returns to S2100.

The flow B will be explained with reference to FIG. 9. In response to a command to start the flow B at S2110, the flow B starts.

At S2200, the session state of the control target ECU is changed from the initial session (B-1) to the diagnostic session (B-2). Specifically, information indicating that the session state of the control target ECU is the diagnostic session is recorded n the RAM.

At S2202, the gateway 1a starts the time measurement of the session timer B. At S2204, the gateway 1a determines whether or not the session state of the control target ECU recognized by the diagnostic tool 2 is the initial session (A-1). When the session state of the control target ECU recognized by the diagnostic tool 2 is the diagnostic session (A-2), corresponding to NO at S2204, the processing proceeds to S2206. At S2206, the gateway 1a determines whether or not the session timer B is time-out.

When the session timer B is not time-out, corresponding to NO at S2206, the processing returns to S2204. When the session timer B is time-out, corresponding to YES at S2206, the processing proceeds to S2208. At S2208, to the control target ECU 4a, the gateway 1a sends the state maintaining request instructing the control target ECU 4a to maintain the diagnostic session. At S2210, the gateway 1a reloads the session timer B, and the processing returns to S2204.

When the session state of the control target ECU recognized by the diagnostic tool 2 is the initial session (A-1), corresponding to YES at S2204, the processing proceeds to S2212. At S2212, the gateway 1a changes the session state of the control target ECU from the diagnostic session (B-2) to the initial session (B-1). Through the above manners, the session state of the control target ECU recognized by the diagnostic tool 2 is synchronized with the session state of the control target ECU.

With reference to FIG. 10, the flow C will be explained. In response to a command to start the flow C at S2114, the flow C starts.

At S2300, the gateway 1a starts time measurement of a P2 timer. The P2 timer is used in determining whether or not a time period from a first time to a second time is within a specified time. The first time is a time when the session request message sent from the diagnostic tool 2 is relayed to the control target ECU by the gateway 1a. The second time is a time when the gateway 1a receives the session response, which the control target ECU sends in response to the receipt of the session request message.

At S2302, the gateway 1a determines whether or not the gateway 1a receives the session response message. When the gateway 1a does not receive the session response message, corresponding to NO at S2302, the processing proceeds to S2312. At S2312, the gateway 1a determines whether or not the P2 timer is time-out. Specifically, the gateway 1a determines whether or not the P2 timer exceeds the specified time.

When the P2 timer exceeds the specified time, corresponding to NO at S2312, the processing returns to S2302. When the gateway 1a receives the session response message from the ECU 4a before the P2 timer exceeds the specified time, corresponding YES at S2302, the processing proceeds to S2304. At S2304, the gateway 1a determines whether or not the session response massage is an affirmative response or a negative response.

When the session response massage is the affirmative response, the gateway 1a relays the response massage to the diagnostic tool 2, and ends this processing.

When the session response massage is the negative response, the processing proceeds to S2308. At S2308, the gateway 1a relays the response message to the diagnostic tool 2. At S2310, the gateway 1a ends the flow B, and ends this processing.

When the P2 timer is time-out without receipt of the session response message from the ECU 4a, corresponding to YES at S2312, the processing proceeds to S2310. At S2310, the gateway ends the flow B, and ends this processing.

Figure 11:
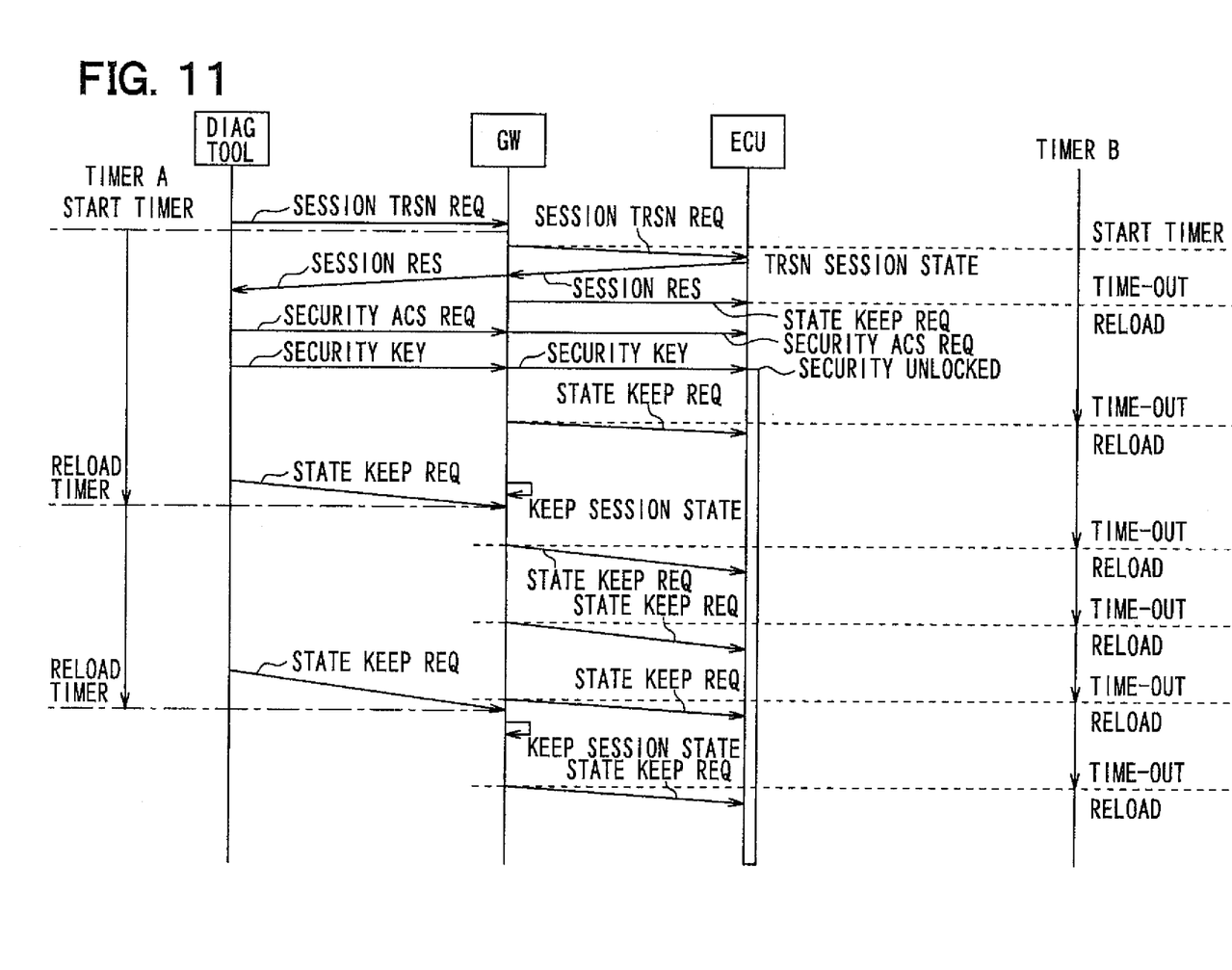
FIG. 11 is a diagram illustrating signal flow among a diagnostic tool, a gateway and an ECU according to the second embodiment.

FIG. 11 illustrates a signal flow among the diagnostic tool 2, the gateway 1a and the ECU 4a in cases where the diagnostic tool 2 sends the request massage to the ECU 4a. This signal flow will be explained with reference to FIG. 11.

When the diagnostic tool 2 sends the session transition request to the ECU 4a, the gateway 1a relays the session transition request to the ECU 4a and starts time measurement of the session timer A and time measurement of the session timer B.

When receiving this session transition request, the ECU 4a transitions from the initial session to the diagnostic session and sends the session response to the diagnostic tool 2.

The gateway 1a relays the session response to the diagnostic tool 2. When the session timer B is time-out, the gateway 1a sends the session state maintaining request to the ECU 4a to instruct the ECU 4a to maintain the diagnostic session on behalf of the diagnostic tool 2. Upon receipt of the session state maintaining request, the ECU 4a maintains the diagnostic session.

Upon receipt of the session response, the diagnostic tool 2 sequentially sends a security access request and a security key to the ECU 4a.

The gateway 1a relays the security access request and the security key to the ECU 4a. When the ECU 4a in the diagnostic session receives the security access request and the security key and establishes he security unlocking, the ECU 4a becomes the security unlocked state.

Each time the session timer B is time-out, the gateway 1a regularly sends the session state maintaining request to the ECU 4a, This session state maintaining request instructs the ECU 4a to maintain the diagnostic session.

When the ECU 4a becomes the security unlocked state, the diagnostic tool becomes able to perform various diagnoses.

Although FIG. 11 illustrates that the state maintaining request sent from the diagnostic tool 2 is not relayed to the ECU by the gateway 1a, the state maintaining request sent from the diagnostic tool 2 may be relayed to the ECU by the gateway 1a.

According to the present embodiment, the diagnostic tool can send a transition request which requests the ECU to transition from the initial session, in which the security setting state (corresponding to a specific service setting state) is to be a security-locked state (corresponding to an initial state), to the diagnostic session (corresponding to a specific session), in which the security setting state is to be a security-unlocked state (corresponding to a specific state). When the ECU receives the transition request from diagnostic tool the via the gateway, the ECU transitions from the initial session to the diagnostic session and sends a session response to the diagnostic tool via the gateway in accordance with receipt of the session transition request. When the diagnostic tool receives the session response, the diagnostic tool sends a state transition request to the ECU via the gateway, where the state transition request requests the security setting state of the ECU to transition from the security-locked state to the security-unlocked state. When the ECU receives the state transition request from the diagnostic tool via the gateway in a state where the ECU has transitioned to the diagnostic session, the security setting state of the ECU transitions from the security-locked state to the security-unlocked state. Upon elapse of a specified time since transitioning of the ECU from the initial session to the diagnostic session, the ECU transitions from the diagnostic session to the initial session and the security setting state returns to the security-locked state. The gateway includes a session timer A, a session state recording device, and a session maintaining request sending device. The session timer A measures an elapsed time from when the gateway receives the session transition request, which is sent from the diagnostic tool to the ECU to request the ECU to transition from the initial session to the diagnostic session. The session state recording device estimates an ECU's session state recognized by the diagnostic tool based on the elapsed time measured by the session timer A, and records the estimated ECU's session state in the RAM (corresponding to a storage medium). When the ECU's session state recognized by the diagnostic tool is determined to be the diagnostic session based on the ECU's session state stored in the RAM, the session maintaining request sending device sends to the ECU a session maintaining request in order to the ECU to prevent the ECU from transitioning from the diagnostic session to the initial session, where the session maintaining request instructs the ECU to maintain the diagnostic session. Accordingly, even when a network configuration is complex and delay of data relay is large, it is possible to diagnose the ECU in the changed specific service setting state.

The gateway further includes the session timer B (corresponding to a second timer) that measures an elapsed time from when the session maintaining request sending device sends the session state maintaining request to the ECU. Thus, it is possible to send regularly the session state maintaining request with use of the session timer B, and it is possible to stably diagnose the ECU in the changed specific service setting state.

When it is determined, based on the ECU's session state stored in the RAM, that the ECU's session state recognized by the diagnostic tool is changed to the diagnostic state (specific state), the session maintaining request sending device stops sending the session state maintaining request. Therefore, it is possible to prevent the security unlocked state (the changed specific service setting state) from continuing for a long time and it is possible to prevent the security from lowering.

The second embodiment can be modified in various ways, examples of which will be described.

In the above embodiment, the CAN communication protocol and the FlexRay communication protocol are used as the communication protocols of the communication buses A to C. However, the communication protocols are not limited to these examples.

In the above embodiment, unlocking the security lock is illustrated as changing the specific service setting state. However, this does not limit the embodiment. For example, the present embodiment is applicable to changing setting states of various services. Specifically, the present embodiment is applicable to changing a user available range, changing a sensor output setting, changing a actuator control setting, or the like.

In the above embodiment, the diagnose tool sends the transition request, which requests the control target ECU to transition from the initial session, in which the security lock is to be maintained, to the diagnostic session, in which the security is to be unlocked. However, the session in which the security is unlocked is not limited to the diagnostic session.

The session in which the security is unlocked may be the programming session, the extended diagnostic session or the like.

In the above embodiment, the RAM 102 can correspond to a storage medium. The session timer A, which may be provided by the CPU 100, can correspond to a first timer. S2112 to S2118, which may be performed by the CPU 100 of the gateway, can correspond to a session state recording device or means. S2202 to S2210, which may be performed by the CPU 100 of the gateway, can correspond to a session maintaining request sending device or means. The session timer B, which may be provided by the CPU 100, can correspond to a second timer.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle network system comprising
a gateway disposed between a network connected with an electronic control unit (ECU) and another network adapted to be connected with a diagnostic tool, the diagnostic tool being configured to diagnose the ECU, wherein:
when the ECU receives a session transition request from the diagnostic tool via the gateway, the ECU transitions from an initial session to a specific session and sends a session response to the diagnostic tool via the gateway in accordance with receipt of the session transition request, where the session transition request requests the ECU to transition from the initial session, in which a specific service setting state is to be an initial state, to the specific session, in which the specific service setting state is to be a specific state different from the initial state;
when the diagnostic tool receives the session response, the diagnostic tool sends a state transition request to the ECU via the gateway, where the state transition request requests the specific service setting state of the ECU to transition from the initial state to the specific state;
when the ECU receives the state transition request from the diagnostic tool via the gateway in a state where the ECU has transitioned to the specific session, the specific service setting state of the ECU transitions from the initial state to the specific state; and
upon elapse of a specified time since transitioning of the ECU from the initial session to the specific session, the ECU transitions from the specific session to the initial session and the specific service setting state returns to the initial state,
the gateway includes:
a first timer that measures an elapsed time from when the gateway receives the session transition request, which is sent from the diagnostic tool to the ECU to request the ECU to transition from the initial session to the specific session;
a session state recording device that estimates an ECU's session state recognized by the diagnostic tool based on the elapsed time measured by the first timer, and records the estimated ECU's session state in a storage medium; and
a session maintaining request sending device that, in cases where the ECU's session state recognized by the diagnostic tool is determined to be the specific session based on the ECU's session state stored in the storage medium,
sends a session state maintaining request, which instructs the ECU to maintain the specific session, to the ECU in order to prevent the ECU from transitioning from the specific session to the initial session.

2. The in-vehicle network system according to claim 1, wherein:
the gateway further includes
a second timer that measures an elapsed time from when the session maintaining request sending device sends the session state maintaining request to the ECU.

3. The in-vehicle network system according to claim 1, wherein:
upon determining, based on the ECU's session state stored in the storage medium, that the ECU's session state recognized by the diagnostic tool transitions the initial state, the session maintaining request sending device stops sending the session state maintaining request.

4. The in-vehicle network system according to claim 1, wherein:
the specific service setting state is a security setting state;
the initial state is a security-locked state; and
the specific state is a security-unlocked state.

* * * * *